United States Patent Office 3,631,141
Patented Dec. 28, 1971

3,631,141
PROCESS FOR PREPARING POLYTETRA-FLUOROETHYLENE ORGANOSOLS
James C. Fang, Media, Pa., assignor to E. I. du Pont de Nemours and Company, Wilmington, Del.
No Drawing. Continuation-in-part of applications Ser. No. 413,333, Nov. 23, 1964, Ser. No. 528,047, Feb. 17, 1966, Ser. No. 654,333, July 19, 1967, Ser. No. 738,822, June 21, 1968, and Ser. No. 19,904, Mar. 12, 1970. This application July 1, 1970, Ser. No. 51,724
Int. Cl. C08f *45/28, 45/34, 47/20*
U.S. Cl. 260—33.4 F                3 Claims

ABSTRACT OF THE DISCLOSURE

A process for preparing a dispersion of polytetrafluoroethylene in an organic liquid, which comprises mixing an organic liquid with an aqueous dispersion of polymer, boiling the mixture, taking off the resulting azeotrope, separating the water from the azeotrope and returning the organic liquid to the boiling mass until it is substantially anhydrous.

CROSS REFERENCES TO RELATED APPLICATIONS

This application is a continuation-in-part of applications Ser. No. 654,333, filed July 19, 1967; 528,047, filed Feb. 17, 1966; 413, 333, filed Nov. 23, 1964, and 738,822, filed June 21, 1968, and Ser. No. 19,094, filed Mar. 12, 1970, all now abandoned.

BACKGROUND OF THE INVENTION

This invention relates to a process for preparing dispersions of polytetrafluoroethylene in organic liquids.

Aqueous dispersions of polytetrafluoroethylene have been known for some time and have been extensively used to coat and impregnate articles with these polymers. These aqueous dispersions, however, have a tendency to coagulate irreversibly when subjected to excessive heat, freezing, mechanical agitation, or on the addition of electrolytes or water soluble solvents. They are also difficult to bond firmly to metal substrates without expensive and bothersome pretreatments.

In an attempt to prepare compositions without these shortcomings, dispersions of these polymers have been prepared in organic liquids. These dispersions, however, have been unsatisfactory because they coagulate undesirably and settle quickly. This makes them unsuitable for commercial use.

The process of this invention makes possible the preparation of dispersions having none of these shortcomings. They are remarkably stable to coagulation, resist settling, and moreover, permit firm bonding of coatings to metal substrates without the pretreatment required when aqueous dispersions are used.

SUMMARY OF THE INVENTION

The polytetrafluoroethylene (PTFE) used to prepare the dispersions is the well-known polymeric material described in U.S. Pat. 2,230,654.

The PTFE should have a molecular weight of at least about 20,000, for materials with molecular weights less than this tend to be waxy and unsuited for preparing dispersions in organic liquids.

PREPARATION OF THE DISPERSIONS

According to the invention, the dispersions are prepared from aqueous dispersions of PTFE whose particles have an average particle radius of from about 0.01 to about 3 microns, with no more than 50% of these particles being larger than 3 microns in radius.[1] Such aqueous dispersions can be obtained commercially.

The aqueous phase of this starting dispersion is displaced with an organic liquid phase. Any organic liquid can be used which has a surface tension of less than about 25 dynes per centimeter,[2] which forms a water/organic liquid azeotrope and which does not physically or chemically interfere with the polymer dispersion. Illustrative of such liquids are t.-butanol and a 2/1 mixture of t. butanol and cyclohexane. Of these, t. butanol gives the best results.

The organic liquid is mixed with up to 50% (by volume) of an aqueous PTFE dispersion, preferably containing about 55% solids. Boiling is then begun and the water/organic liquid azeotrope is continuously distilled off. This azeotrope is collected, condensed, and the organic liquid phase is separated by conventional methods and returned to the vessel. Distillation is continued until the material remaining in the vessel is substantially anhydrous. "Substantially anhydrous," as it is used in this context, means less than about 1.0%, by weight, of water.

If the resulting product is slightly coagulated, it can be milled, preferably in a ball or pebble mill, for from 2–100 hours, the period depending on the degree of coagulation. As a general rule, 24 hours of milling is enough.

The dispersions prepared in this way contain discrete polymer particles having an average radius of about 0.01 to about 3 microns, no more than 50% (by weight) of the particles having radii larger than 3 microns. Generally speaking, stability of the dispersions increases with decreasing particle size. Highly preferred dispersions therefore have particles whose average radius ranges from 0.01 to 0.9 micron.

The dispersions contain from about 1% to about 50%, by weight, of particulate polymer. Dispersions preferred for their stability contain about 30–40% (by weight) of polymer. The dispersions will vary in viscosity according to their solids content and according to the organic liquids used, and can range from free-flowing to thixotropic viscid fluids.

The dispersions are highly stable. They can remain in storage for extended periods with no appreciable coagulation or changes in viscosity. If over a period of time slight settling should occur, the particles can be easily redispersed by agitating the dispersions briefly. In addition, the dispersions do not coagulate on heating, freezing agitation or on addition of salts, electrolytes or other miscible organic liquids.

Utility

These dispersions are suitable for direct use as coating compositions but pigments otherwise suitable for use in organic coating compositions can be added if desirable. The compositions can be applied by such conventional methods as spraying, brushing, dipping or roller coating. They air dry quickly, leaving behind powdery residues of polymer which give the coated articles lubricious surfaces. The dispersions are therefore highly useful as lubricating sprays for industrial and household purposes. Those dispersions in which the organic liquid is a "Freon"® fluorocarbon can be packaged in conventional aerosol spray cans.

---

[1] Measured by direct microscopic examination at a magnification of about 750 diameters. Particle dimensions can be measured by comparison with an eye-piece scale or by direct comparison with markings on a calibrated slide.
Particle size can also be measured by the angular dependent light scattering method described by Aughey, et al. in J. Opt. Soc. Am., 44, 833 (1954).
Particles smaller than about 1.0 micron can be measured by electron microscopy.
[2] Measured at 25° C. by the du Nouy ring method, as described in American Society for Testing and Materials, Method D 1331–56.

Tough, permanent, continuous, lubricious films of PTFE can be produced on any substrate capable of withstanding the heat treatment involved by applying a dispersion of the invention to a substrate and then heating it to a temperature of from about 650–800° F. for 10–30 minutes. Such fused films are a boon on kitchen utensils and ice-cube trays, where they prevent sticking and caking. The films also have good electrical insulating properties.

DESCRIPTION OF THE PREFERRED EMBODIMENTS

The following example is submitted so that the invention can be more easily understood and readily practiced. It is intended to be illustrative and shows only the preferred embodiment of the invention. Those skilled in the art will no doubt be able to compose numerous variations on this theme. It is fully intended that these variations be considered part of the basic inventive concept.

In the example, all proportions are by weight unless otherwise indicated.

EXAMPLE 1

To a glass pot were charged 400 parts of t.-butanol and 200 parts of cyclohexane. Four hundred parts of a 61.6% aqueous polytetrafluoroethylene dispersion whose particles had an average diameter of about 0.2 micron, with no particles larger than about 3 microns, were then added with stirring. The standard specific gravity of the PTFE was 2.289 and the melt viscosity was $0.12 \times 10^{10}$ poises at 380° C. as determined by the American Society for Testing and Materials, Methods D–1457–56T and D–1238–57T respectively.

When the addition of the polytetrafluoroethylene dispersion was complete, the mixture was heated to and kept at reflux temperature, and the water/organic liquid azeotrope was continuously distilled off. The organic liquid phase was separated and returned to the pot.

At the end of 7 hours, 178 parts of water had been collected, leaving behind about 813 parts of a white, slightly thixotropic dispersion of polytetrafluoroethylene whose particles had an average diameter of about 0.2 micron, with no particles bigger than about 3 microns. The water content of the dispersion, as determined by Karl Fisher analysis was 0.97–0.98%.

The dispersion, when sprayed on an ordinary steel panel and air dried, gave a highly lubricious finish.

I claim:
1. A process for preparing an organosol of PTFE, said process comprising:
   (A) mixing an organic liquid which has a surface tension below about 25 dynes per centimeter (measured at 25° C.), is capable of forming an azeotrope with water and which does not chemically or physically interfere with the polymer dispersion with up to 50% by volume of an aqueous dispersion of PTFE particles having an average radius of from about 0.01 to about 3 microns, with no more than 50% of the particles being larger than three microns in radius, the PTFE having a molecular weight of at least 20,000, in a vessel;
   (B) boiling the mixture; and
   (C) withdrawing the vapors of the resulting water/organic liquid azeotrope, separating the organic liquid from the water and returning the organic liquid to the vessel, until the organic liquid in the vessel is substantially anhydrous.

2. The process of claim 1 wherein the organic liquid is t.-butanol.

3. The process of claim 1 wherein the organic liquid is a mixture of t. butanol and cyclohexane.

References Cited

UNITED STATES PATENTS

| | | | |
|---|---|---|---|
| 2,328,399 | 8/1943 | Saunders et al. | 203—14 |
| 3,260,693 | 7/1966 | Stand | 260—33.4 F |

ALLAN LIEBERMAN, Primary Examiner

U.S. Cl. X.R.

260—33.6 F, 34.2